United States Patent
Albero et al.

(10) Patent No.: US 12,413,581 B2
(45) Date of Patent: Sep. 9, 2025

(54) ALTERNATIVE DISTRIBUTION AND ACCESSING OF ONE-TIME PASSWORDS (OTPs)

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 191 days.

(21) Appl. No.: 18/218,501

(22) Filed: Jul. 5, 2023

(65) Prior Publication Data
US 2025/0016151 A1    Jan. 9, 2025

(51) Int. Cl.
  *H04L 9/40* (2022.01)
  *H04L 29/06* (2006.01)
(52) U.S. Cl.
  CPC ...... *H04L 63/0838* (2013.01); *H04L 63/0853* (2013.01); *H04L 63/107* (2013.01)
(58) Field of Classification Search
  CPC ............. H04L 63/0838; H04L 63/0853; H04L 63/107; H04L 63/08; H04L 63/0846; H04L 63/108; G06F 21/34; G06F 21/42
See application file for complete search history.

(56) References Cited

U.S. PATENT DOCUMENTS

| | | | |
|---|---|---|---|
| 7,558,964 B2 | 7/2009 | Bermudez et al. | |
| 8,225,102 B1 | 7/2012 | Palmer et al. | |
| 8,281,375 B2 | 10/2012 | Von Krogh | |
| 9,119,076 B1 * | 8/2015 | Gubbi | H04L 63/0853 |
| 9,686,272 B2 | 6/2017 | Blinn | |
| 10,812,473 B2 | 10/2020 | Ramesh Kumar et al. | |
| 11,038,896 B2 | 6/2021 | Dasgupta et al. | |
| 11,321,444 B2 | 5/2022 | Woo | |
| 11,334,880 B2 | 5/2022 | Karnik et al. | |
| 11,606,353 B2 | 3/2023 | Zaloum et al. | |
| 11,743,265 B2 | 8/2023 | Lakunishok et al. | |
| 2015/0195276 A1 | 7/2015 | Buer et al. | |
| 2022/0255913 A1 | 8/2022 | Zacks et al. | |
| 2022/0255934 A1 | 8/2022 | Henry et al. | |
| 2022/0385656 A1 | 12/2022 | Gujarathi | |
| 2023/0171088 A1 | 6/2023 | Ragan et al. | |
| 2023/0412610 A1 * | 12/2023 | Goldstein | H04L 63/0838 |

\* cited by examiner

*Primary Examiner* — Edward Zee
(74) *Attorney, Agent, or Firm* — Moore & Van Allen PLLC; Anup Iyer (57) ABSTRACT

Alternative distribution/communication of and access to One-Time Passwords/Passcodes (OTPs). Triggering events are detected that result in the OTP being communicated to a communication device different from the device designated by the user for receiving OTPs. The triggering event may be determination that the user's designated device (i) is not currently in possession of the user, (ii) is located in a geo-location designated for No-OTP receipt, and/or (iii) is currently in an inoperable state. The different communication device may be a device other than one in possession/control of the user and may be a device designated by the user or the device may be one selected, based on proximity of location to the user, from a network of trusted devices/individuals.

17 Claims, 4 Drawing Sheets

ALTERNATIVE DISTRIBUTION AND ACCESSING OF ONE-TIME PASSWORDS (OTPs)

FIELD OF THE INVENTION

The present invention is related generally to user authentication and, more specifically, determining triggering events that result in distribution of One-Time Passwords (OTP) to communication devices other than the primary communication designated by the user being authenticated.

BACKGROUND

One-Time Passwords (OTPs) are typically associated with multi-factor user authentication. As the first factor in authentication a user will provide standard log-in credentials (e.g., username and password) and in response to validation of such, the second factor provides for communication of an OTP to a designated user device, typically the user's mobile communication device. Once the user receives and submits the OTP, the OTP validated is the user is deemed to be authenticated.

However, many problems exist related to OTPs and, specifically, the communication of OTPs to users. For example, the user may not currently possess or otherwise be proximate to their designated user device (i.e., mobile communication device). In other instances, the user may possess the designated user device but the device is currently in an operable state (e.g., the device is not receiving cellular and/or wi-fi signals, the battery is fully depleted or the device is in "airplane mode").

In other instances, the user may currently be unwilling to receive OTPs. For example, the user may be currently receiving communication via a public/unsecure Wi-Fi network and, from a security perspective, does not desire to subject the OTP communication to possible interception by a wrongdoer. In another example, the user may be currently located outside of their local cellular network coverage area (e.g., on international travel), such that, communication of the OTP over the cellular network will incur undesirable roaming rates.

Therefore, a need exists to develop systems, methods, computer program products that provide for an alternative delivery/communication mode for OTPs. The desired systems, methods and the like should allow for the user to receive the OTP and/or for authentication to proceed even if the user is not in possession of the mobile device designated for receiving OTPs or if the mobile device is currently in an operable state. Moreover, the desired systems, methods and the like should allow for the user to receive the OTP and/or for authentication to proceed in instances in which the user is unwilling to receive an OTP communication on their designated mobile device, such as, when the designated mobile device is currently communicating over an unsecured communication network or the user/designated mobile device is located outside of their local cellular network coverage area.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for alternative distribution/communication of and access to One-Time Passwords/Passcodes (OTPs). In this regard, the present invention is capable of detecting triggering events that result in the OTP being communicated to a communication device different from the device designated by the user for receiving OTPs (e.g., a device other than the user's mobile telephone).

In specific embodiments of the invention, the triggering event may occur prior to communicating an OTP to the user's designated device. For example, the triggering event may be determination that the user's designated communication device is not proximate to or otherwise in possession of the user or the triggering event may be determination that the user is currently in a geo-location designated for No-OTP receipt/communication (e.g., a user-designated country, region or like in which the user is unwilling to receive OTPs).

In other specific embodiments of the invention, the triggering event may occur after communication of an initial OTP has been attempted to the user's designated device. For example, the triggering event may be determination that the OTP has not been received by the user's designated communication device, i.e., the device is currently in an operable state, such as no cellular and/or wi-fi service, the battery is fully depleted or the device is in airplane mode. In other example, the triggering event may be determination that the OTP has not been used, i.e., validated, within the allotted time for validation or a determination that another OTP has been requested.

According to embodiments of the invention, once the triggering event has been determined to occur, an OTP (either the initial OTP which delivery to the user's designated device was attempted or another OTP) is communicated to a different device. In specific embodiments of the invention, the user designates the different device. For example, the user may designate a family member's or friend's mobile communication device as the device they desire to have the OTP communicated to in the event of a triggering event occurrence. In other specific embodiments of the invention, a trusted network of OTP delivery devices is formed and the OTP is delivered to a selected one of the devices in the network. The selection of which device to communicate the OTP to may be based on proximity of the user to a device in the network (e.g., the device closest to the user is selected or the like). In this regard, the devices in the network may be stationary devices (e.g., kiosks, ATMs or the like) or the devices may other mobile communication devices in the possession of trusted individuals (e.g., notaries, bank associates, colleague or the like). When the device to which the OTP is communicated is in the possession of another user/individual, user-designated or otherwise, the other user/individual may perform the authentication (i.e., submit the OTP on behalf of the user being authenticated) or the other user/individual may communicate the OTP to the user being authenticated.

A system for alternative distribution of One-Time Passwords (OTPs) defines first embodiments of the invention. The system includes a computing platform having a memory and one or more computing processor devices in communication with the memory. The memory stores and an authentication application that is executable by at least one of the one or more computing processor devices. The authentication application is configured to receive a first request for communication of an OTP to a first user. In response to receiving the first request, the authentication application is configured to determine one or more of (i) prior to communicating a first OTP to the first user, that a first communication device designated by the first user for receiving OTPs (i.e., the user's primary device for receiving OTPs) is not proximate to the first user, (ii) prior to communicating a first OTP to the first user, that the first communication device is within a geo-location designated for No-OTP receipt, (iii) after communicating the first OTP to the first communication device, that the first OTP has not been received by the first communication device, (iv) after communicating the first OTP to the first communication device, that an allotted time for validating the first OTP has lapsed, and (v) after communicating the first OTP to the first communication device, that a second request for communication of the OTP to the first user has been received. In response to determining either (i) or (ii), the authentication application is configured to identify a second communication device for communication of the first OTP and communicate the first OTP to the second communication device. Moreover, in response to determining one of (iii), (iv) or (v), the authentication application is configured to identify the second communication device for re-communication of the first OTP to the second communication device or communication of a second OTP to the second communication device and re-communicate the first OTP to the second communication device or communicate a second OTP to the second communication device.

In specific embodiments of the system, the second communication device is a device that is not in possession of or controlled by the first user (i.e., a separate standalone communication device (e.g., kiosk or ATM device) or a device in the possession/control of another (e.g., a mobile communication in the possession of a designated user (e.g., family member, friend or the like) or a trusted user (e.g., notary, bank teller or the like).

In further specific embodiments of the system the authentication application is further configured to identify the second communication device for communication of the first OTP or the second OTP by determining a geo-location of the first user and identifying the second communication device based on proximity of a geo-location of the second communication device to the geo-location of the first user. In related embodiments of the system, the authentication application is further configured to identify the second communication device based on proximity of the geo-location of the second communication device to the current geo-location of the first user by accessing a predetermined listing of a network of second communication devices that maps each second communication device to at least one of a registered OTP recipient or a geo-location. In this regard, the second device may be a stationary device (e.g., kiosk, ATM or the like) or the second device may be a mobile communication device with location determining means (e.g., GPS or the like) possessed by registered OTP recipient (e.g., notary, bank teller, co-worker or the like)

In further specific embodiments of the system, the authentication application is further configured to identify the second communication device for communication of the first OTP or the second OTP by accessing a predetermined list of designated OTP recipients that maps each designated OTP recipient to a corresponding second communication device. In specific embodiments of the system, the designated OTP recipients are designated by the first user (e.g., family member(s), friend(s) of the first user or the like) and the predetermined list is an ordered list that ranks one or more designated OTP recipients in terms of the order in which the OTP is to be sent for purposes of authenticating the first user.

In further specific embodiments of the invention, the authentication application is further configured to determine that the first communication device is within a geo-location designated, by the first user, for No-OTP receipt. In this regard, the first user may temporarily or permanently designate certain countries or regions for No-OTP receipt, meaning that OTPs are not to communicated to the user's primary communication device (i.e., first communication device) when the user is located in designated geo-location.

In additional specific embodiments of the system, the authentication application is further configured to (i) reset or increase the allotted time for validating the first OTP prior to communicating the first OTP to the second communication device or (ii) provide for an extended allotted time for validating the second OTP prior to communicating the second OTP to the second communication device. Such, resetting or extending of the allotted time for validation provides additional time to complete validation based on the OTP being communicated to a device other than the user's primary device (i.e., being communicated to the second communication device).

Moreover, in additional embodiments of the system, the authentication application is further configured to notify a second user in possession of the second communication device that an OTP being used to authenticate the first user is being communicated to the second communication device. In further embodiments of the system, the authentication application is further configured to, in response to the second communication device receiving the first OTP or the second OTP, present an input field at the second communication device configured to receive input of the first OTP or the second OTP by the first user or a second user in possession of the second communication device and submit the first OTP or second OTP for purposes of authenticating the first user.

A computer-implemented method for alternative distribution of One-Time Passwords (OTPs) defines second embodiments of the invention. The method is executable by one or more computing device processors. The method includes receiving a first request for communication of an OTP to a first user. In response to receiving the first request, the method includes determining, at least one of (i) prior to communicating a first OTP to the user, that a first communication device designated by the first user for receiving OTPs is not proximate to the first user, (ii) prior to communicating a first OTP to the user, that the first communication device is within a geo-location designated for No-OTP receipt, (iii) after communicating the first OTP to the first communication device, that the first OTP has not been received by the first communication device, (iv) after communicating the first OTP to the first communication device, that an allotted time for validating the first OTP has lapsed, and/or (v) after communicating the first OTP to the first communication device, that a second request for communication of the OTP to the first user has been received. In response to determining either (i) or (ii), the method further includes identifying a second communication device for communication of the first OTP and communicate the first OTP to the second communication device. In response to determining one of (iii), (iv) or (v), the method includes identifying the second communication device for re-communication of the first OTP to the second communication device or communication of a second OTP to the second communication device and re-communicate the first OTP to the second communication device or communicate a second OTP to the second communication device.

In specific embodiments of the computer-implemented method, the second communication device is a device that is not in possession of or controlled by the first user. For example, the second communication device may be a mobile communication device in the possession of/controlled by a second user who has designated by the first user (e.g., family member, friend, colleague or the like) or is trusted user (e.g., notary, bank associate or the like). In other instances, the second communication device may be a stationary device not in the possession of another user (e.g., a kiosk, ATM or the like).

In further specific embodiments of the computer-implemented method, identifying the second communication device for communication of the first OTP or the second OTP further includes determining a geo-location of the first user and identifying the second communication device based on proximity of a geo-location of the second communication device to the geo-location of the first user.

Moreover, in further embodiments of the computer-implemented method, identifying the second communication device for communication of the first OTP or the second OTP further includes accessing a predetermined user-specified ordered list of designated OTP recipients that maps each designated OTP recipient to a corresponding second communication device. The ordered listing indicates an order in which OTPs are to be communicated to the one or more designated OTP recipients for purposes of effecting authentication of the first user.

In additional specific embodiments of the computer-implemented method, determining that the first communication device is within a geo-location designated for No-OTP receipt further includes determining that the first communication device is within a geo-location designated, by the first user, for No-OTP receipt. A computer program product including a non-transitory computer-readable medium defines third embodiments of the invention. The computer-readable medium includes sets of codes for causing one or more computing devices to receive a first request for communication of an OTP to a first user. The sets of codes further cause the computing device(s) determine, one or more of, (i) prior to communicating a first OTP to the first user, that a first communication device designated by the first user for receiving OTPs is not proximate to the first user, (ii) prior to communicating a first OTP to the first user, that the first communication device is within a geo-location designated for No-OTP receipt, (iii) after communicating the first OTP to the first communication device, that the first OTP has not been received by the first communication device, (iv) after communicating the first OTP to the first communication device, that an allotted time for validating the first OTP has lapsed, and (v) after communicating the first OTP to the first communication device, that a second request for communication of the OTP to the first user has been received. Further, in response to determining either (i) or (ii), the sets of codes cause the computing device(s) to identify a second communication device for communication of the first OTP and communicate the first OTP to the second communication device. Alternatively, in response to determining one of (iii), (iv) or (v) the sets of codes cause the computing device(s) to identify the second communication device for re-communication of the first OTP to the second communication device or communication of a second OTP to the second communication device and re-communicate the first OTP to the second communication device or communicate a second OTP to the second communication device.

In specific embodiments of the computer program product, the second communication device is a device that is not in possession of or controlled by the first user. For example, the second communication device may be a mobile communication device in the possession of/controlled by a second user who has designated by the first user (e.g., family member, friend, colleague or the like) or is trusted user (e.g., notary, bank associate or the like). In other instances, the second communication device may be a stationary device not in the possession of another user (e.g., a kiosk, ATM or the like).

In other specific embodiments of the computer program product, the set of codes for causing the one or more computing devices to identify the second communication device for communication of the first OTP or the second OTP further include codes for causing the one or more computing devices to determine a geo-location of the first user and identify the second communication device based on proximity of a geo-location of the second communication device to the geo-location of the first user.

In additional specific embodiments of the computer program product, the set of codes for causing the one or more computing devices to identify the second communication device for communication of the first OTP or the second OTP further include codes for causing the one or more computing devices to access a predetermined user-specified ordered list of designated OTP recipients that maps each designated OTP recipient to a corresponding second communication device. The ordered listing indicates an order in which OTPs are to be communicated to the one or more designated OTP recipients.

Moreover, in other specific embodiments of the computer program product, the set of codes for causing the one or more computing devices to determine that the first communication device is within a geo-location designated for No-OTP receipt further includes codes for causing the one or more computing devices to determine that the first communication device is within a geo-location designated, by the first user, for No-OTP receipt.

Thus, according to embodiments of the invention, which will be discussed in greater detail below, the present invention provides for alternative distribution/communication of and access to One-Time Passwords/Passcodes (OTPs). In this regard, the present invention is capable of detecting triggering events that result in the OTP being communicated to a communication device different from the device designated by the user for receiving OTPs. The triggering event may be determination that the user's designated device (i) is not currently in possession of the user, (ii) is located in a geo-location designated for No-OTP receipt, and/or (iii) is currently in an inoperable state. The different communication device may be one designated by the user (e.g., a family member's or friend's device or the like) or the different device may be one selected, based on proximity of location to the user, from a network of trusted devices/individuals (e.g., kiosks, ATMs, devices possessed by trusted individuals, such as, notaries, bank associates, colleagues or the like). Once the OTP has been communicated to the different device, the individual in possession of the different device may submit the OTP for validation (i.e., complete the authentication process) or may communicate the OTP to the user or the user may be required to travel to the device (e.g., kiosk, ATM or the like) to receive the OTP.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for alternative distribution/communication of and access to One-Time Passwords/Passcodes (OTPs). In this regard, the present invention is capable of detecting triggering events that result in the OTP being communicated to a communication device different from the device designated by the user for receiving OTPs (e.g., a device other than the user's mobile telephone).

In specific embodiments of the invention, the triggering event may occur prior to communicating an OTP to the user's designated device. For example, the triggering event may be determination that the user's designated communication device is not proximate to or otherwise in possession of the user or the triggering event may be determination that the user is currently in a geo-location designated for No-OTP receipt/communication (e.g., a user-designated country, region or like in which the user is unwilling to receive OTPs).

In other specific embodiments of the invention, the triggering event may occur after communication of an initial OTP has been attempted to the user's designated device. For example, the triggering event may be determination that the OTP has not been received by the user's designated communication device, i.e., the device is currently in an operable state, such as no cellular and/or wi-fi service, the battery is fully depleted or the device is in airplane mode. In other example, the triggering event may be determination that the OTP has not been used, i.e., validated, within the allotted time for validation or a determination that another OTP has been requested.

According to embodiments of the invention, once the triggering event has been determined to occur, an OTP (either the initial OTP which delivery to the user's designated device was attempted or another OTP) is communicated to a different device. In specific embodiments of the invention, the user designates the different device. For example, the user may designate a family member's or friend's mobile communication device as the device they desire to have the OTP communicated to in response to occurrence of a triggering event. In other specific embodiments of the invention, a trusted network of OTP delivery devices is formed and the OTP is delivered to a selected one of the devices in the network. The selection of which device to communicate the OTP to may be based on proximity of the user to a device in the network (e.g., the device closest to the user is selected or the like). In this regard, the devices in the network may be stationary devices (e.g., kiosks, ATMs or the like) or the devices may other mobile communication devices in the possession of trusted individuals (e.g., notaries, bank associates, colleague or the like). When the device to which the OTP is communicated is in the possession of another user/individual, user-designated or otherwise, the other user/individual may perform the authentication (i.e., submit the OTP on behalf of the user being authenticated) or the other user/individual may communicate the OTP to the user being authenticated. When the device to which the OTP is communicated to is a stationary device (e.g., kiosk, ATM or the like) the user is responsible for travelling to the device to retrieve the OTP.

Figure 1:
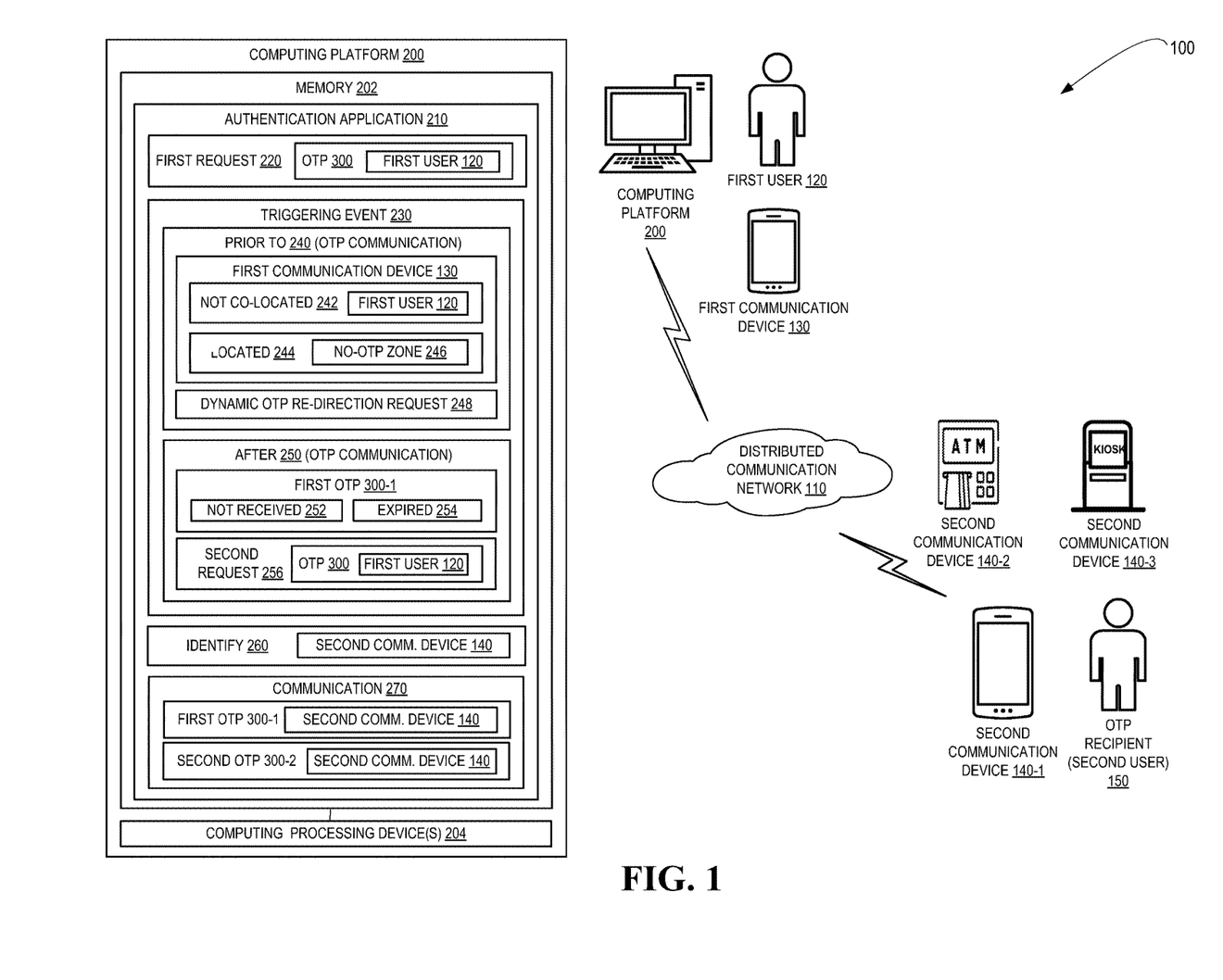
FIG. 1 is a schematic/block diagram of a system for alternative distribution/communication of One-Time Passwords (OTPs), in accordance with embodiments of the present invention.

Referring to FIG. 1, a schematic/block diagram is presented of a system 100 for alternative distribution/communication of One-Time Passwords/codes, in accordance with embodiments of the invention. The system 100 is implemented in conjunction with a distributed communication network 110 that may include the Internet, one or more intranets, one or more cellular networks or the like. System 100 includes computing platform 200, which may comprise a personal computer and/or back-end applications servers. Computing platform 200 includes memory 202 and one or more computing processing devices 204 in communication with memory 202. Memory 202 stores authentication application 210 that is executable by at least one of the computing device processor(s) 204.

Authentication application 210 is configured to receive a first request 220 for communication of a One-Time Password (OTP) 300 to a first user 120. In specific embodiments of the invention, first request 220 is part of a multi-factor authentication process and may be generated in response to validating user credentials (e.g., username/passcode, biometric data or the like) submitted by first user 120. In response to receiving first request 220, authentication application is configured to detect/determine one of a plurality of triggering events 230. Triggering events include events that occur prior to 240 communication of a first OTP 300-1 to first communication device 130 (i.e., the device that first user 120 has designated as the primary device for OTP 300 receipt, e.g., the user's mobile communication device) and events that occur after 250 communication of first OTP 300-1 to first communication device 130.

Triggering events that are detected/determined prior to 240 communication of a first OTP 300-1 to first communication device 130 include (i) determining that first communication device 130 is not co-located 242 with first user 120, (ii) determining that first communication device 130 is located 244 in a designated no OTP zone 246, and (iii) determining that first user 120 has submitted a dynamic OTP redirection request 248.

Triggering events that are detected/determined after 250 communication of a first OTP 300-1 to first communication device 130 include (i) determining that first communication device 130 did not receive 252 first OTP 300-1 (i.e., first communication device is in operable state, e.g., no cellular and/or wi-fi service, battery fully depleted or in airplane plane), (ii) determining that the allotted time for validating first OTP 300-1 has expired/lapsed 254 and (iii) receiving a second request 256 for communication of an OTP 300 to the first user 120.

In response to determining one or more triggering events 230, authentication application 230, is further configured to identify a second communication device 140 and, in response to identification of the second communication device 140, communicate either first OTP 310-1 or, in some instances, a newly generated second OTP 310-2 to the identified second communication device 140. In specific embodiments of the invention, second communication device 140 is a device that is not in possession or control of the first user 120. In this regard, second communication device 140-1 may be device in possession of a second user 150 (i.e., OTP recipient). In such embodiments of the invention, second user 150 may be user designated by the first user 120, such as a friend, family member, colleague or the like. In other such embodiments of the invention, second user 150 may be user who is a member of a trusted OTP recipient network, such as a notary, a financial institution associate, a work colleague or the like. In other embodiments of the invention, second communication device 140 is a stationary device, such as Automated Teller Machine 140-2, kiosk 140-3 or the like.

In response to communication of the OTP 300 to the second communication device 140, either (i) second user 150 will submit the OTP 300 for validation on behalf of the first user 120 to complete the authentication process, (ii) second user 150 will communicate the OTP 300 to the first user 120 and first user 120 will submit the OTP to complete the, authentication process, or (iii) first user 120 will be responsible to travel to second communication device (e.g., ATM 140-2, kiosk-3), retrieve the OTP 300 and submit the OTP to complete the authentication process, typically on the second communication device (e.g., ATM 140-2, kiosk-3).

Figure 2:
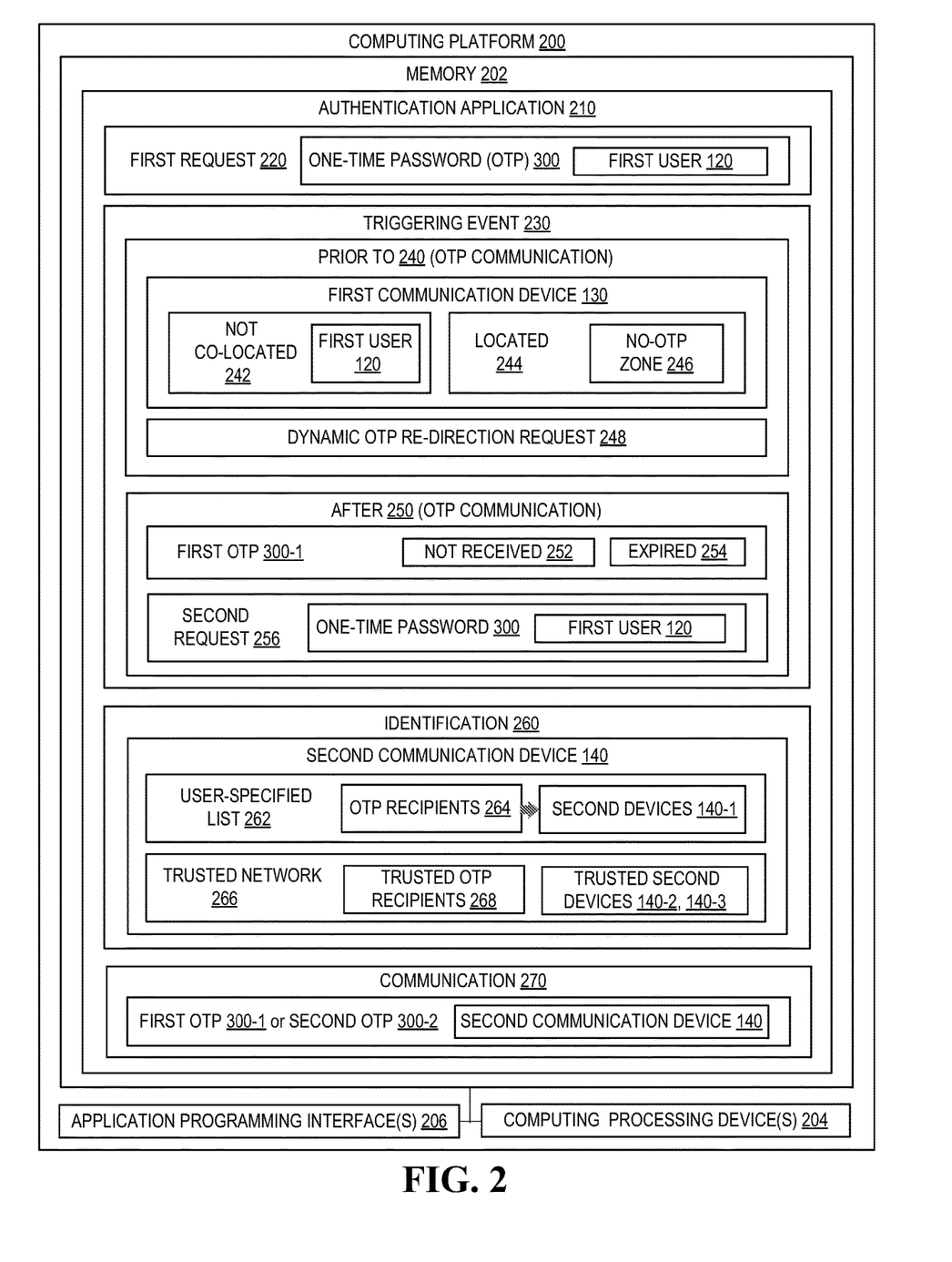
FIG. 2 is schematic/block diagram of a computing platform including an authentication application configured alternative distribution/communication of OTPs; in accordance with embodiments of the present invention.

Referring to FIG. 2, a block diagram is presented of computing platform 200, in accordance with embodiments of the present invention. In addition to providing greater details of authentication application 210, FIG. 2 highlights various alternate embodiments of the invention. Computing platform 200 may comprise one or multiple devices, such as a PC, laptop and/or application servers or the like. Thus, according to specific embodiments of the invention, the functionality herein described of authentication application 210 may occur exclusively at a PC or laptop or at both a PC/laptop and back-end application server(s).

Computing platform 200 includes memory 202, which may comprise volatile and/or non-volatile memory, such as read-only and/or random-access memory (RAM and ROM), EPROM, EEPROM, flash cards, or any memory common to computing platforms). Moreover, memory may comprise cloud storage, such as provided by a cloud storage service and/or a cloud connection service.

Further, computing platform 200 includes one or more computing processing devices 204, which may be an application-specific integrated circuit ("ASIC"), or other chipset, logic circuit, or other data processing device. Computing processing device(s) 204 may execute one or more application programming interface (APIs) 206 that interface with any resident programs, such as authentication application 210 or the like, stored in memory 202 of computing platform 200 and any external programs. Computing processing devices(s) 204 may include various processing subsystems (not shown in FIG. 2 embodied in hardware, firmware, software, and combinations thereof, that enable the functionality of computing platform 200 and the operability of computing platform 200 on a distributed communication network 110 (shown in FIG. 1), such as the Internet, intranet(s), cellular network(s) and the like. For example, processing subsystems allow for initiating and maintaining communications and exchanging data with other networked devices. For the disclosed aspects, processing subsystems of computing platform 200 may include any subsystem used in conjunction with authentication application 210 and related tools, routines, sub-routines, algorithms, sub-algorithms, sub-modules thereof.

In specific embodiments of the present invention, computing platform 200 additionally includes a communications module (not shown in FIG. 2) embodied in hardware, firmware, software, and combinations thereof, that enables electronic communications between components of computing platform 200 and other networks and network devices. Thus, communication module may include the requisite hardware, firmware, software and/or combinations thereof for establishing and maintaining a network communication connection with one or more devices and/or networks.

As discussed in FIG. 1, memory 202 of computing platform 200 stores authentication application 210, which is executable by at least one of the one or more computing processor devices 204. As previously discussed in relation to FIG. 1, authentication application 210 is configured to receive a first request 220 for communication of a One-Time Password (OTP) 300 to a first user 120. In specific embodiments of the invention, first request 220 is part of a multi-factor authentication process and may be generated in response to validating user credentials (e.g., username/passcode, biometric data or the like) submitted by first user 120.

In response to receiving first request 220, authentication application is configured to detect/determine one of a plurality of triggering events 230. Triggering events include events that occur prior to 240 communication of a first OTP 300-1 to first communication device 130 (i.e., the device that first user 120 has designated as the primary device for OTP 300 receipt, e.g., the user's mobile communication device) and events that occur after 250 communication of first OTP 300-1 to first communication device 130.

Triggering events that are detected/determined prior to 240 communication of a first OTP 300-1 to first communication device 130 include (i) determining that first communication device 130 is not co-located 242 with first user 120, (ii) determining that first communication device 130 is located 244 in a designated no OTP zone 246, and (iii) determining that first user 120 has submitted a dynamic OTP redirection request 248.

Determining that the first communication device 130 is not co-located 242 with first user 120 means that first communication device 130 is not proximate to or within physical possession of first user 120. Co-location and/or proximity may be defined in terms of a specific distance, same physical dwelling or the ability of the user to physically possess the first communication device 130 with a time substantially equal to the time allotted for OTP validation. Geo-locations of the first communication device 130 and the first user may be determined by a GPS device or the like in the first communication device and GPS device or device-implemented IP addresses in the device generating the first request 220 (PC, laptop or the like).

In specific embodiments of the invention, the system or, more likely, the user may designate geo-locations, such as countries or geo-fenced zones/areas as No-OTP receipt zones 246, i.e., zones/areas in which No OTPs are to be received by the first communication device. When the first communication device 130 is determined to be located within a No-OTP receipt zone, all OTPs intended for first communication device 130 will instead be communicated to a second communication device 140.

An OTP re-direction request 248 may be dynamically generated by the first user 120 prior to or during an authentication process that requires OTP validation. For example, first user 120 may have security concerns (e.g., unsecure wi-fi only available communication network or the like) with the area where they are currently located and, as result desires to re-direct the communication of the first OTP 300-1 away from the first communication device 130 and towards a second communication device 140.

Triggering events that are detected/determined after 250 communication of a first OTP 300-1 to first communication device 130 include (i) determining that first communication device 130 did not receive 252 first OTP 300-1 (i.e., first communication device is in operable state, e.g., no cellular and/or wi-fi service, battery fully depleted or in airplane plane), (ii) determining that the allotted time for validating first OTP 300-1 has expired/lapsed 254, and (iii) receiving a second request 256 for communication of an OTP 300 to the first user 120.

Determining that the allotted time for validating first OTP 300-1 has expired/lapsed 254 or determining receipt of a second request 256 for communication of an OTP 300 to the first user 120 may be indicative of having not received the first OTP 300-1 or otherwise being unable to access the first OTP 300-1.

In response to determining one or more triggering events 230, authentication application 230, is further configured to identify a second communication device 140 and, in response to identification of the second communication device 140, communicate either first OTP 310-1 or, in some instances, a newly generated second OTP 310-2 to the identified second communication device 140. In specific embodiments of the invention, second communication device 140 is a device that is not in possession or control of the first user 120. In this regard, second communication device 140-1 may be device in possession of a second user 150 (i.e., OTP recipient). In such embodiments of the invention, second user 150 may be identified by accessing a user-specified list 262 of designated OTP recipients 264 that are mapped to corresponding second communication devices 140-1. In this embodiment, the OTP recipients 264 may be family members, friends and the like. In specific embodiments the user-specified list is an ordered/ranked listing in which the OTP recipients are listed in the order in which the OTP is to be communicated (e.g., first listed OTP recipients receives the OTP first and, if they don't validate the OTP or communicate it to the first user 120, an OTP is communicated to the second listed OTP recipient and so on). In such embodiments of the invention, the list may include (or end with) communication of the OTP to a member of the trusted network of OTP recipients/devices, such that if none of the user-specified OTP recipients 264 respond (i.e., fail to validate the OTP or communicate the OTP to the first user 120), the OTP is a communicated to a member of the trusted network of OTP recipients/devices.

In other such embodiments of the invention, identification 260 of the second communication device 140 includes selecting the second communication device 140 from a trusted network 266 of trusted OTP recipients, such as notaries, financial institution associates, work colleagues or the like or a trusted device, such as Automated Teller Machine 140-2, kiosk 140-3 or the like. In such embodiments of the invention, the selection of the device from the trusted network 266 is based on proximity of the trusted OTP recipient or trusted second device 140-2, 140-3 to the first user 120.

Once the second communication device 140 has been identified, authentication application 210 is configured to communicate either the first OTP 300-1 (i.e., re-transmission) or a newly generated second OTP 300-2 to the second communication device 140. In response to communication of the OTP 300 to the second communication device 140, either (i) second user 150 will submit the OTP 300 for validation on behalf of the first user 120 to complete the authentication process, (ii) second user 150 will communicate the OTP 300 to the first user 120 and first user 120 will submit the OTP to complete the, authentication process, or (iii) first user 120 will be responsible to travel to second communication device (e.g., ATM 140-2, kiosk-3), retrieve the OTP 300 and submit the OTP to complete the authentication process, typically on the second communication device (e.g., ATM 140-2, kiosk-3).

Figure 3:
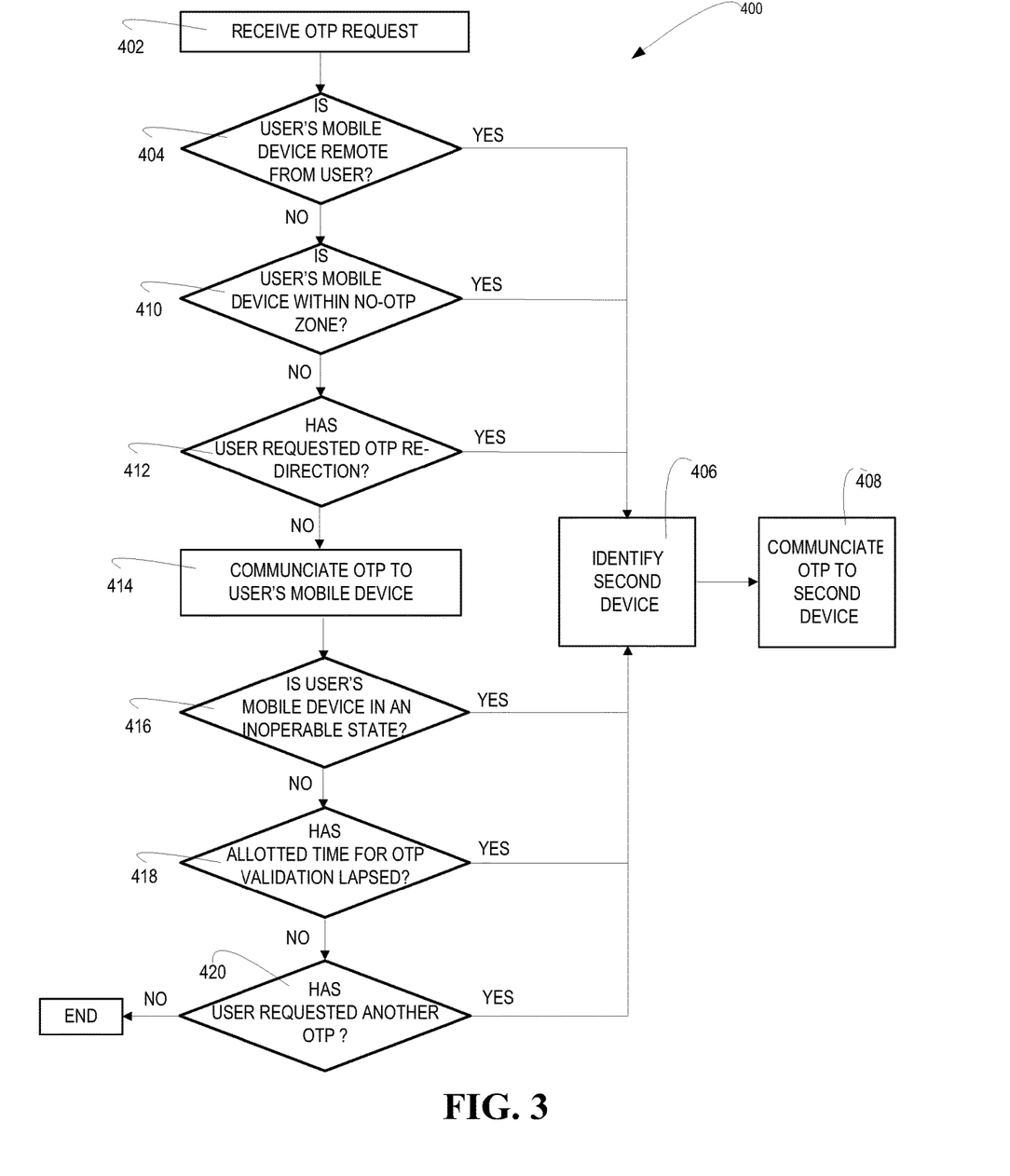
FIG. 3 is a flow diagram of a method for alternative distribution/communication of OTPs, in accordance with embodiments of the present invention.

Referring to FIG. 3, a flow diagram is depicted of a method for alternative distribution/communication of OTPs to devices other than the user's primary OTP receipt device, in accordance with embodiments of the present invention. At Event 402, a request is received for communication of an OTP to a user. The request may be part of a multi-factor authentication of the user, in which OTP validation is one of the authentication factors.

Prior to communication of the OTP to the first user, at Decision 404, a determination is made as to whether the user's mobile device (i.e., the device that the user has designated as the primary device for OTP delivery) is remote from the user (i.e., not proximate to or in possession of the user). Remoteness or proximity may be defined in terms of a specific distance, different dwellings or whether the user can acquire possession of the OTP within the allotted time for OTP validation. The geo-location of the user's mobile device and geo-location of the device at which the OTP request has been submitted may be obtained by GPS (Global Positioning System) functionality in the devices and/or correlation of device-implemented IP addresses to geo-locations.

In response to determining that the user's mobile device is remote from the user, at Event 406, a second communication device is identified and, at Event 408, an OTP is communicated to the identified second device. The second communication device may be identified by accessing a user-designated list of OTP recipients that maps the designated OTP recipients to their respective mobile device identifiers (i.e., the second communication devices). In other embodiments of the method, the second communication may be identified by accessing a list of trusted devices (e.g., ATMs, kiosks or the like) and/or trusted OTP recipients (e.g., notaries, financial institution associates, work colleagues or the like) with the trusted OTP recipients mapped to their respective mobile device identifiers (i.e., the second communication devices).

In response to determining that the user's mobile device is not remote from the user (i.e., the user is proximate and/or in possession of their mobile device) or at any time prior to communication of the OTP to the first user, at Decision 410, a determination is made as to whether the mobile device is located with a No-OTP receipt zone. In specific embodiments of the invention, the system or user may designate specific areas (e.g., countries, geo-fenced regions or the like) in which the system or user desires not to receive OTPs (the desire may be based on security concerns with the area/zone and or cost associated with delivering OTPs to the area/zone). In response to determining that the user's mobile device is located within a designated No-OTP receipt zone, at Event 406, a second communication device is identified and, at Event 408, an OTP is communicated to the identified second device.

In response to determining that the user's mobile device is not located within a No-OTP receipt zone or at any time prior to communication of the OTP to the first user, at Decision 412, a determination is made as to whether a request for OTP re-direction has been received from the user. In this regard, the user may dynamically determine, based on security concerns related to the locale or communication network, that they want the OTP to be delivered to device other than their mobile device and submit a request for such. In response to determining that the request for OTP re-direction has been received, at Event 406, a second communication device is identified and, at Event 408, an OTP is communicated to the identified second device.

In response to determining that (i) the user's mobile device is not remote from the user (i.e., the user is proximate and/or in possession of their mobile device), (ii) the user's mobile device is not located within a No-OTP receipt zone and (iii) the user has no requested OTP re-direction, at Event 414, an OTP is communicated to the user's mobile device.

In response to communication of the OTP, at Decision 416 a determination is made as to whether the user's mobile is in an inoperable state (i.e., unable to receive the OTP). The inoperable state may be due to lack of cellular or wi-fi signal detection, battery fully depleted and/or the device being in an airplane mode or some other mode in which communication signals are not being received). In response to determining that the user's mobile device is in an operable state/unable to receive the OTP, at Event 406, a second communication device is identified and, at Event 408, an OTP is communicated to the identified second device.

In response to determining that the OTP is in an operable state (i.e., has received the OTP), at Decision 418, a determination is made as whether the allotted time for OTP validation has lapsed. If the allotted time has elapsed it may be indicative that the user is unable to access the OTP or does not desire to access/validate the OTP at this point in time. In response to determining that the allotted time for OTP validation has elapsed, at Event 406, a second communication device is identified and, at Event 408, an OTP is communicated to the identified second device.

In response to determining that the allotted time for OTP validation has not elapsed, at Decision 420, a determination is made as whether a second requests or a designated number of requests has been received for communication of an OTP to the user. Subsequent requests for additional OTP communication may indicate that the prior OTP was not received at the mobile device or is inaccessible to the user. In response to determining that a second request or designated number of additional requests have been received, at Event 406, a second communication device is identified and, at Event 408, an OTP is communicated to the identified second device.

It should be noted that while the embodiments shown in FIG. 3, indicate that a single decision in the affirmative results in identification of a second device and communication of an OTP to the second device, one of ordinary skill in the art will appreciate that in other embodiments of the invention more than one decision in the affirmative will be required for identification of a second device and communication of an OTP to the second device. In this regard, the invention may be configured such that any combination of two or more triggering events (decisions in FIG. 3) are required for the OTP to be communicated to a second device.

Figure 4:
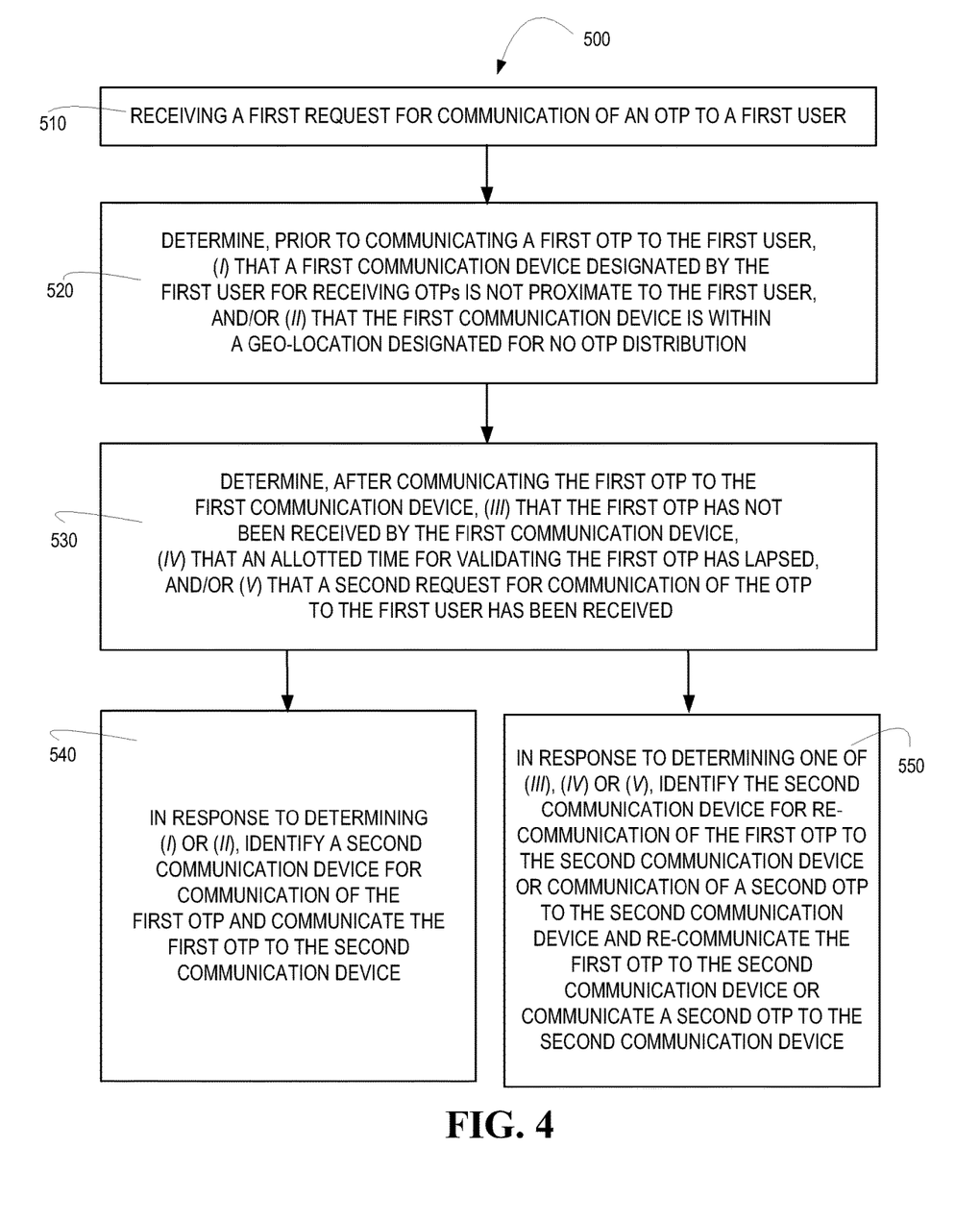
FIG. 4 is a flow diagram of a method for alternative distribution/communication of OTPs, in accordance with embodiments of the present invention.

Referring to FIG. 4, a flow diagram is depicted of a method 500 for alternate communication of OTPs, in accordance with embodiments of the present invention. At Event 510, a first request is received for communication of an OTP to a first user. The first request may be received as part of a multi-factor user authentication process. In response to receiving the request, at Events 520 and 530, at least one triggering event is determined. The triggering events that occur prior to communicating a first OTP to the first user (Event 520) include (i) determining that a first communication device designated by the first user for receiving OTPs is not proximate to (i.e., in the immediate possession of) the first user, and (ii) determining that the first communication device is within a geo-location designated for No-OTP receipt. Triggering events that occur after communicating the first OTP to the first communication device (Event 530) include (iii) determining that the first OTP has no been received by the first communication device (i.e., the device is in an inoperable state for communication receipt, such as, no cellular and/or wi-fi signals being received, battery fully depleted or device is an airplane or similar mode of operation), (iv) determining that an allotted time for OTP validation has lapsed, and/or (v) determining receipt of a second request for communication of an OTP to the first user.

In response to determining at least one of (i) and (ii), at Event 540, a second communication device is identified for OTP communication and the first OTP is communicated to the identified second communication device. As previously discussed, the second communication device may be a device associated with a second user (family member, friend or the like) designated by the first user or the second communication device may be trusted device or trusted second user selected from a network of trusted second users/devices. In specific embodiments of the method, the selection of trusted device or trusted second user may be based on proximity in geo-location to the first user.

In response to determining at least one of (iii), (iv) and (v), at Event 550, a second communication device is identified for OTP communication and the first OTP is re-transmitted to the identified second communication device or a second OTP is communicated to the identified second communication device.

Thus, present embodiments of the invention discussed in detail above, provide for alternative distribution/communication of and access to One-Time Passwords/Passcodes (OTPs). As previously discussed, the present invention is capable of detecting triggering events that result in the OTP being communicated to a communication device different from the device designated by the user for receiving OTPs. The triggering event may be determination that the user's designated device (i) is not currently in possession of the user, (ii) is located in a geo-location designated for No-OTP receipt, and/or (iii) is currently in an inoperable state. The different communication device may be one designated by the user (e.g., a family member's or friend's device or the like) or the different device may be one selected, based on proximity of location to the user, from a network of trusted devices/individuals (e.g., kiosks, ATMs, devices possessed by trusted individuals, such as, notaries, bank associates, colleagues or the like). Once the OTP has been communicated to the different device, the individual in possession of the different device may submit the OTP for validation (i.e., complete the authentication process) or may communicate the OTP to the user or the user may be required to travel to the device (e.g., kiosk, ATM or the like) to receive the OTP.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for alternative distribution of One-Time Passwords (OTPs), the system comprising:
a computing platform including a memory and one or more computing processor devices in communication with the memory, wherein the memory stores an authentication application that is executable by at least one of the one or more computing processor devices and configured to:
receive a first request for communication of an OTP to a first user,
determine prior to communicating a first OTP to the first user: (i) that a first communication device designated by the first user for receiving OTPs is not proximate to the first user, or (ii) that the first communication device is within a geo-location designated for No-OTP receipt,
in response to determining (i) or (ii), identify a second communication device for communication of the first OTP and communicate the first OTP to the second communication device,
determine after communicating the first OTP to the first communication device: (iii) that the first OTP has not been received by the first communication device, (iv) that an allotted time for validating the first OTP has lapsed, or (v) that a second request for communication of the OTP to the first user has been received, and
in response to determining one of (iii), (iv) or (v), identify the second communication device for re-communication of the first OTP to the second communication device or communication of a second OTP to the second communication device and re-communicate the first OTP to the second communication device or communicate the second OTP to the second communication device, wherein identifying the second communication device for communication of the first OTP or the second OTP further comprises determining a geo-location of the first user and identifying the second communication device based on proximity of a geo-location of the second communication device to the geo-location of the first user.

2. The system of claim 1, wherein the second communication device is a device that is not in possession of or controlled by the first user.

3. The system of claim 1, wherein the authentication application is further configured to identify the second communication device based on proximity of the geo-location of the second communication device to the geo-location of the first user by accessing a predetermined listing of a network of second communication devices that maps each second communication device to at least one of a registered OTP recipient or a geo-location.

4. The system of claim 1, wherein the authentication application is further configured to identify the second communication device for communication of the first OTP or the second OTP by accessing a predetermined list of designated OTP recipients that maps each designated OTP recipient to a corresponding second communication device.

5. The system of claim 4, wherein the authentication application is further configured to identify the second communication device for communication of the first OTP or the second OTP by accessing the predetermined list of designated OTP recipients that maps each designated OTP recipients to the corresponding second communication device, wherein the predetermined list is predetermined by the first user and provides for an ordered listing of one or more designated OTP recipients, wherein the ordered listing indicates an order in which OTPs are to be communicated to the one or more designated OTP recipients.

6. The system of claim 1, wherein the authentication application is further configured to determine that the first communication device is within the geo-location designated for No-OTP receipt, wherein the geo-location designated for No-OTP receipt is predefined by the first user.

7. The system of claim 1, wherein the authentication application is further configured to (i) reset or increase the allotted time for validating the first OTP prior to communicating the first OTP to the second communication device or (ii) provide for an extended allotted time for validating the second OTP prior to communicating the second OTP to the second communication device.

8. The system of claim 1, wherein the authentication application is further configured to notify a second user in possession of the second communication device that an OTP being used to authenticate the first user is being communicated to the second communication device.

9. The system of claim 1, wherein the authentication application is further configured to, in response to the second communication device receiving the first OTP or the second OTP, present an input field at the second communication device configured to receive input of the first OTP or the second OTP by the first user or a second user in possession of the second communication device and submit the first OTP or second OTP for purposes of authenticating the first user.

10. A computer-implemented method for alternative distribution of One-Time Passwords (OTPs), the method being executable by one or more computing device processors and comprising:

receiving a first request for communication of an OTP to a first user;

determining prior to communicating a first OTP to the first user: (i) that a first communication device designated by the first user for receiving OTPs is not proximate to the first user, or (ii) that the first communication device is within a geo-location designated for No-OTP receipt, in response to determining (i) or (ii), identifying a second communication device for communication of the first OTP and communicate the first OTP to the second communication device, determining after communicating the first OTP to the first communication device: (iii) that the first OTP has not been received by the first communication device, (iv) that an allotted time for validating the first OTP has lapsed, or (v) that a second request for communication of the OTP to the first user has been received, and in response to determining one of (iii), (iv) or (v), identifying the second communication device for re-communication of the first OTP to the second communication device or communication of a second OTP to the second communication device and re-communicate the first OTP to the second communication device or communicate the second OTP to the second communication device, wherein identifying the second communication device for communication of the first OTP or the second OTP further comprises determining a geo-location of the first user and identifying the second communication device based on proximity of a geo-location of the second communication device to the geo-location of the first user.

11. The computer-implemented method of claim 10, wherein the second communication device is a device that is not in possession of or controlled by the first user.

12. The computer-implemented of claim 10, wherein identifying the second communication device for communication of the first OTP or the second OTP further comprises accessing a predetermined list of designated OTP recipients that maps each designated OTP recipient to a corresponding second communication device, wherein the predetermined list is predetermined by the first user and provides for an ordered listing of one or more designated OTP recipients, wherein the ordered listing indicates an order in which OTPs are to be communicated to the one or more designated OTP recipients.

13. The computer-implemented method of claim 10, wherein determining that the first communication device is within a geo-location designated for No-OTP receipt further comprises determining that the first communication device is within a geo-location designated, by the first user, for No-OTP receipt.

14. A computer program product comprising:

a non-transitory computer-readable medium comprising sets of codes for causing one or more computing devices to:

receive a first request for communication of an OTP to a first user;

determine prior to communicating a first OTP to the first user: (i) that a first communication device designated by the first user for receiving OTPs is not proximate to the first user, or (ii) that the first communication device is within a geo-location designated for No-OTP receipt, in response to determining (i) or (ii), identify a second communication device for communication of the first OTP and communicate the first OTP to the second communication device, determine after communicating the first OTP to the first communication device: (iii) that the first OTP has not been received by the first communication device, (iv) that an allotted time for validating the first OTP has lapsed, or (v) that a second request for communication of the OTP to the first user has been received, and in response to determining one of (iii), (iv) or (v), identify the second communication device for re-communication of the first OTP to the second communication device or communication of a second OTP to the second communication device and re-communicate the first OTP to the second communication device or communicate the second OTP to the second communication device, wherein identifying the second communication device for communication of the first OTP or the second OTP further comprises determining a geo-location of the first user and identifying the second communication device based on proximity of a geo-location of the second communication device to the geo-location of the first user.

15. The computer program product of claim 14, wherein the second communication device is a device that is not in possession of or controlled by the first user.

16. The computer program product of claim 14, wherein the set of codes for causing the one or more computing devices to identify the second communication device for communication of the first OTP or the second OTP further include codes for causing the one or more computing devices to access a predetermined list of designated OTP recipients that maps each designated OTP recipient to a corresponding second communication device, wherein the predetermined list is predetermined by the first user and provides for an ordered listing of one or more designated OTP recipients, wherein the ordered listing indicates an order in which OTPs are to be communicated to the one or more designated OTP recipients.

17. The computer program product of claim 14, wherein the set of codes for causing the one or more computing devices to determine that the first communication device is within a geo-location designated for No-OTP receipt further includes codes for causing the one or more computing devices to determine that the first communication device is within a geo-location designated, by the first user, for No-OTP receipt.

* * * * *